219-121 SR

MTR04 XR 3,684,557

Aug. 15, 1972 G. KIENEL 3,684,557

METHOD FOR VACUUM EVAPORATION OF HIGH MELTING POINT NON-METALLIC MATERIALS

Filed July 30, 1970 2 Sheets-Sheet 1

Inventor:
Gerhard Kienel
By Joseph F. Padlon
attorney

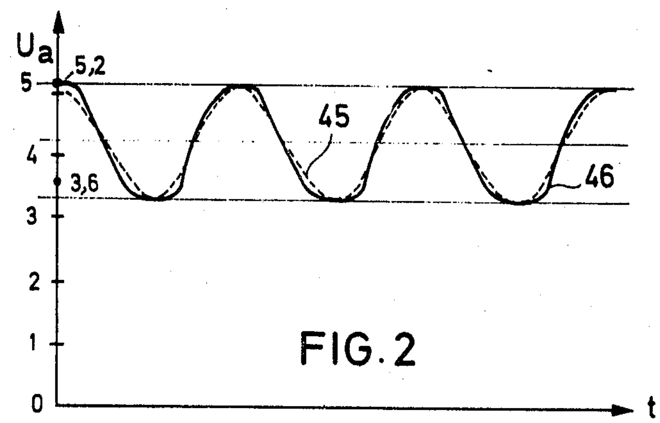
FIG. 2
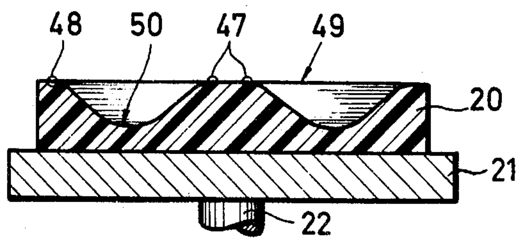
FIG. 3
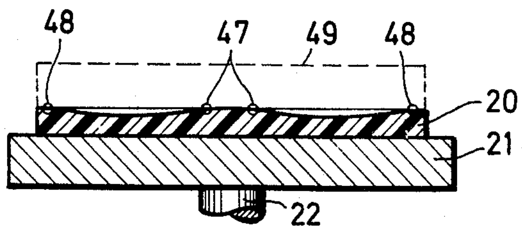
FIG. 4
FIG. 5
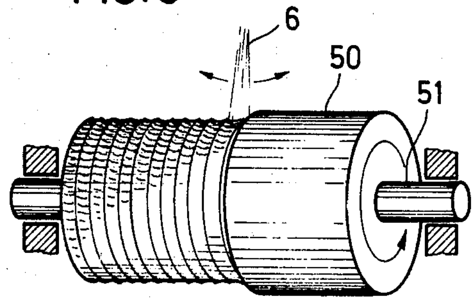
FIG. 6
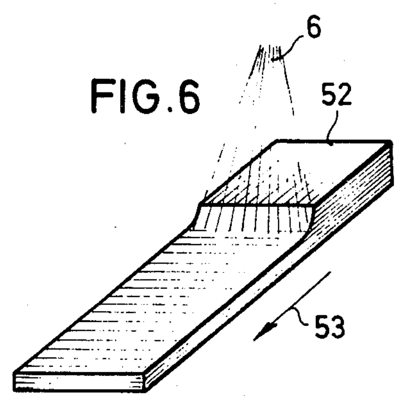
Inventor:
Gerhard Kienel
by Joseph F. Fallon,
Attorney United States Patent Office 3,684,557
Patented Aug. 15, 1972

3,684,557

METHOD FOR VACUUM EVAPORATION OF HIGH MELTING POINT NON-METALLIC MATERIALS

Gerhard Kienel, Mittelbuchen, Uber Hanau am Main, Germany, assignor to Leybold-Heraeus Verwaltung GmbH, Cologne-Bayental, Germany Filed July 30, 1970, Ser. No. 59,536
Claims priority, application Germany, Aug. 13, 1969, P 19 41 215.8
Int. Cl. C03c *23/00;* B44d *1/02*
U.S. Cl. 117—93.3 3 Claims

ABSTRACT OF THE DISCLOSURE

A method of and device for forming coatings of non-metallic materials of high melting point, in vacuo, by the use of an electron beam.

The invention relates to a method for producing coatings of non-metallic materials of high melting point by vacuum evaporation and particularly for coatings of silicon dioxide or glass on substrates by evaporation of these materials in a vacuum by means of a focused beam of electron rays which heats the material to its evaporation temperature by oscillating scanning transversely to the direction of feed.

It is known from the German Patent 882,174 that materials are evaporated in a vacuum by means of a beam of electron rays, the electron beam being deflected oscillatingly to different evaporator crucibles. The deflection is achieved by means of electrical or electromagnetic fields. In the known arrangement, however, the electron beam is always directed again to the same point of the individual materials to be evaporated so that only a narrowly limited amount of each material can be evaporated.

Heretofore, it has also been proposed to evaporate quartz from the surface of a quartz cylinder which rotates relative to the electron beam. The beam of electron rays is deflected harmonically; that is, according to a sine function and parallel to the cylinder axis and transversely to the direction of movement of the cylinder surface, the amplitude of the deflecting movement being a small fraction of the length of the quartz cylinder. The wobbling electron beam moves relative to the cylinder during the evaporation process in a helix about the cylinder axis and thereby evaporates quartz from the entire surface. Regardless of the oscillations, the electron beam leaves helical grooves in the quartz cylinder which make it impossible to use the same quartz cylinder in a second evaporation process because the grooves present produce a directed and limited stream of vapor which is not suitable for many evaporation processes. The quartz cylinder therefore must be replaced although only a small fraction of the total quartz present has been evaporated. Aside from the high cost of suitable evaporation material, it is a disadvantage of this arrangement that vacuum equipment must be vented to the atmosphere in order to permit replacement of the cylinder and must thereafter again be evacuated to a high vacuum.

The grooves formed are indicative of the non-uniform use of the energy of the electron beam for the evaporation process proper. In materials other than quartz, a non-uniform input of thermal energy has the additional disadvantage of causing thermal stresses which cause the material to be evaporated to be broken under mechanical stresses, thus making it necessary to interrupt the evaporation process, with the result that there are many rejects. Non-uniform evaporation of the material that is being evaporated and the resulting formation of grooves may have several causes which may occur singly or in combination. The deflection of a highly focused electron beam from its middle position can be accompanied by a change in the magnitude of the focused spot. If the output is set for a constant value, the energy density and thus evaporation rate are changed. Moreover, the material to be evaporated has finite dimensions, both when used in the form of a continuous solid body as well as in the form of a granulate. The amount of heat available in the marginal areas is different from that in the center of the material which is to be evaporated because of heat losses by radiation and conduction. Ultimately, when material is evaporated, from the front or face of a circular disc, on which the beam of electrons oscillates along a radial line between the center and the periphery, much more material is present in the marginal zone and available for evaporation than in the center of the disc.

With the above in view, it is an object of the present invention to avoid the disadvantages inherent in known evaporation processes and to provide a method by which a high percentage of the expensive starting materials can be evaporated at a constant rate of evaporation and without interruption. No groove-shaped recesses and no excessive directional properties of the beam of evaporated material are to be generated; moreover, the danger of a crack in the material that is being evaporated is to be avoided when the material is furnished in compact form as a disc, plate or block.

The object is achieved, according to the invention, by controlling the electron beam in such a manner that the energy supplied by the beam to the material to be evaporated is enhanced per unit of volume at least in the area of reversal of the electron beam beyond a value which is necessary during scanning with a harmonic deflection movement. The enhancement of the energy transmitted to the material to be evaporated per unit of volume, can be achieved by permitting the electron beam to dwell at the points of reversal and/or in the vicinity of these points. It is also possible to increase the power intensity of the beam in these points which can be achieved according to the known electrical relationships by increasing the beam-voltage U or the beam-current I, or by increased focussing and by thus reducing the focal spot, F. Obviously, combination of these measures can be employed successfully.

One would expect that the known harmonic, that is, sine-shaped oscillation of the electron beam would in itself produce a solution of the problem which is at the root of this invention. If one considers a sine-shaped movement of the beam, the velocity of deflection of the beam decreases in a direction to the points of reversal to a value of 0, and thereafter increases again in the opposite direction. In other words, the dwell time of the beam at the point of the reversal and in the vicinity has already been increased in the known method. It has been found, however, that these properties inherent in the system of harmonic beam deflection are not sufficient and that additional measures must be resorted to which go beyond the means provided by the harmonic deflection movement.

A particularly advantageous and simple arrangement for carrying out the method of the invention consists of a generator for an electron beam associated with a deflecting device for the electron beam which is potential-responsive or current-responsive, a periodically variable resistor being arranged in the current supply line for the deflection device. According to this invention, the resistor is provided with a drive which, with respect to the terminal positions of the resistor, has a lost motion. The simplest form of such a drive is a crank linkage drive or force which is driven at a constant rotary speed, and whose crank engages an element of the moving contact of the resistor, a limited play being available between the crank and the engaged element. In this manner, the dwell time of the electron beam at the point of reversal is extended.

The invention is not limited to specific geometrical shapes of the evaporated material, and is applicable to the evaporation of rectangular prisms, which are moved linearly relative to the electron beam during evaporation, also to the evaporation from the frontal surface of circular discs which rotate about their central axis, and to the evaporation from the curved surface of cylinders rotating about their longitudinal axis, and ultimately to the evaporation of granulated material confined in a container.

The spatial position of the surfaces from which the materials are to be evaporated do not limit the application of the method of the invention. Both the usual horizontal as well as a vertical position are possible, with the exception of granulated material.

The evaporation method of the invention is applicable with particular advantage to the evaporation of materials from the frontal face of rotating, relatively long cylinders, which are moved against the electron beam in an axial direction at the rate at which the material is evaporated. The feeding movement is resorted to for the purpose that the surface from which the evaporation takes place always maintains its position in space.

It has been found that frequencies of oscillation which are between 0.1 and 10 Hz, and preferably between 0.5 and 2 Hz are most suitable.

Other features of the invention, the modes of operation of the method according to the state of the art and according to the invention, and an embodiment of apparatus for performing the method of the invention, are described herein following in more detail, reference being made to the accompanying drawing in which:

FIG. 1 shows an electron beam evaporator with an associated control device, in a perspective view;

FIG. 2 provides a comparison of the deflecting voltages fed to the deflecting device, when the beam is controlled by harmonic control and according to the invention;

FIG. 3 shows disc-shaped material to be evaporated and its turntable after application of the known evaporating method, the view being in cross section;

FIG. 4 shows a cross-sectional view according to FIG. 3, but after application of the method according to the invention;

FIG. 5 illustrates the application of the method according to the invention to the curved surface of a rotating cylinder; and FIG. 6 shows the application of the method according to the invention to the surface of a rectangular prism moving in a straight line.

Figure 1:
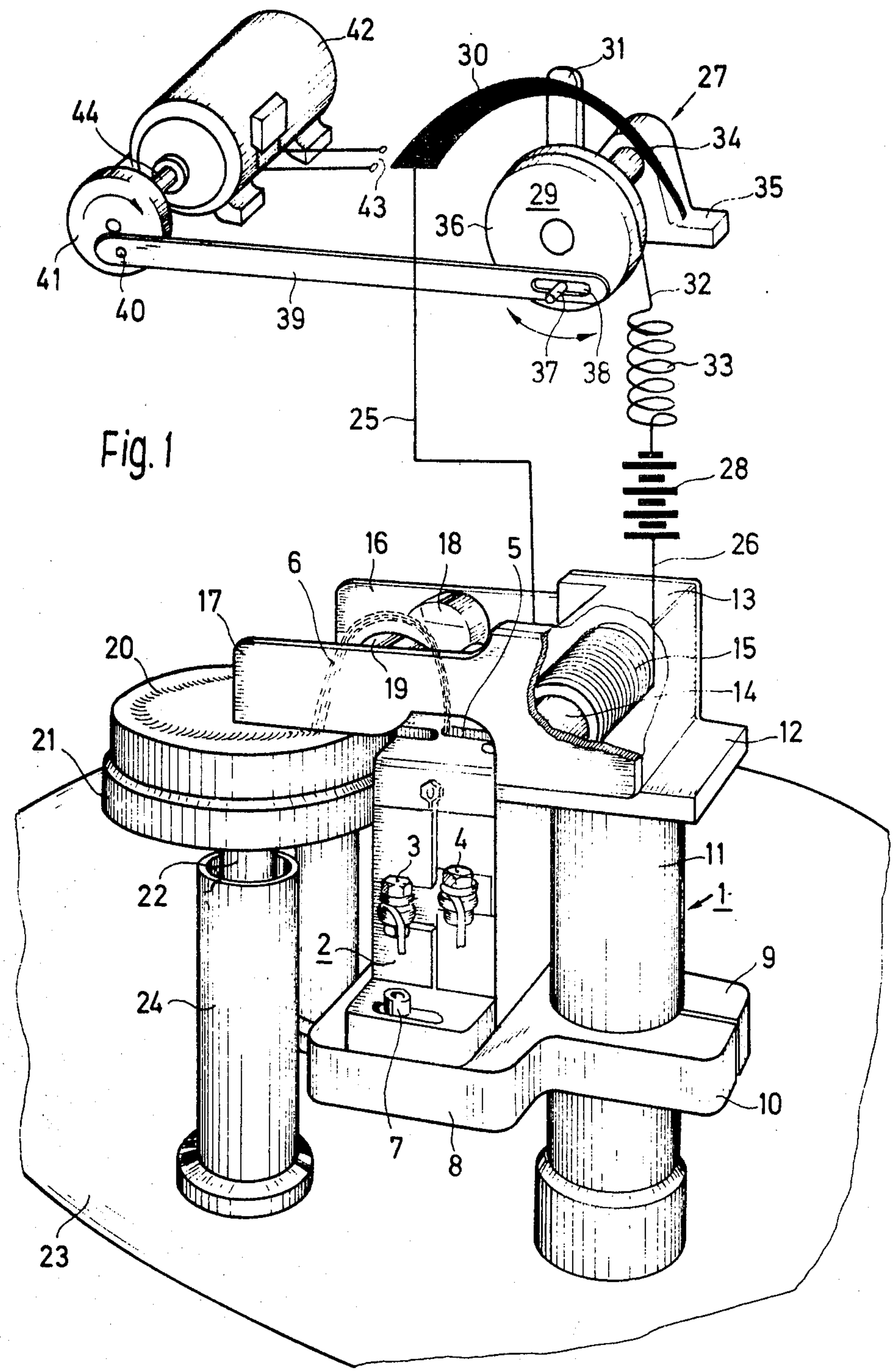

Referring now to the drawings, it will be noted that an electron beam evaporator 1 is shown in FIG. 1 and includes an electron beam generator 2, hereinafter referred to briefly as the gun. The details of such a gun are commonly known, and therefore do not require detailed explanation. The heating and accelerating voltages are applied to binding posts 3 and 4. The gun has a discharge opening 5 for the beam 6 of electron rays, which is deflected 180° and is secured on a base plate 8 by means of a screw 7 so as to be capable of horizontal adjustment. For adjusting purposes, the base plate 8 itself may be adjusted vertically by means of clamping jaws 9 and 10 which secure the plate on a column 11. The column 11, at its upper end, carries a mounting plate 12 on which a deflecting device 13 for the electron beam 6 is arranged. Said deflecting device 13 consists of an iron core 14 surrounded by a deflecting coil 15. From the two ends of the iron core 14, two parallel pole plates 16, 17 extend and have two oppositely arranged pole shoes, 18, 19, near their free ends remote from the iron core 14. The pole shoes define therebetween an air gap for the passage of the electron beam 6.

A circular disc 20 of the material to be evaporated, such as quartz, is arranged below the pole plates 16, 17. Disc 20 is supported on a turntable 21 mounted on a shaft 22 which passes through the base plate 23 of the entire system, being sealed by means of a gasket. The gasket, not itself shown, is arranged within a tubular nipple 24.

The deflecting coil 15 is connected by two conductors 25, 26 with a control apparatus 27 which contains a source of voltage 28 and a potentiometer 29. The potentiometer 29 consists of a resistor 30 and a sliding contact 31 which engages the resistor 30, as is known in itself.

Conductor 25 leads to the resistor 30 and another conductor 32 leads from the sliding contact 31 by way of a conductive, but resilient element 33 to the voltage source 28 whose other pole is connected with the deflector coil 15 by conductor 26. The circuit is closed in this manner; the intensity of the current, and thus the strength of the deflecting magnetic field, depending on the position of the potentiometer 29.

The sliding contact 31 is mounted on a shaft 34 which is journaled in a bearing block 35. The shaft furthermore carries a rotatable disc 36 which is fixedly coupled with the sliding contact 31. Moreover, disc 36 has an accentric engaging element 37. A crank lever 39 engages the engaging element 37 by means of a longitudinal slot 38, the crank cooperating by means of an additional crank pin 40 with a crank disc 41 of an electric drive motor 42. The motor is provided with current from terminals 43 and drives the crank disc 41 by means of shaft 44. Preferably, a gear motor or a speed reducing transmission may be provided. In order to prevent rotation of the shaft 34 and sliding contact 31, it is necessary that the eccentricity of the crank 40 is smaller than that of the engaging element 37.

The illustrated apparatus operates as follows:

Drive motor 42 is stopped, and it shall be assumed that the sliding contact 31 is located in the central position illustrated. The control device 27, and thereby a flow of current in the deflector coil 15 are adjusted in such a manner that the focal spot of the electron beam 6, which is incidentally on the disc 20, is located in a central position; that is, approximately in the middle of a radius of the disc 20. When the drive motor 42 is started, the crank disc 41, the disc 36, and thus the sliding contact 31 rotate, but only perform periodical oscillating movements. The resistance of the potentiometer 29 is thereby also periodically varied, and correspondingly the deflecting voltage at the deflecting coil 15. As a consequence there is a periodical movement to and fro of the focal spot on the disc 20. Because the central axis of the deflecting device 13 intersects the axis of rotation of the disc 20, and because the electron beam 6 is located in the plane of symmetry of the deflecting device 13, the focal spot of the beam 6 moves along a radial line relative to the disc 20. The arrangement of this control device 27 of the deflecting device 13 is such that the focal spot of the beam 6 moves during the reciprocating movement of the sliding contact 31 from one terminal position to the other fairly precisely from the center of the disc 20 to its rim. These two limiting positions of the beam 6 or of its focal spot area also referred to as points of reversal. Because the disc 20 simultaneously rotates under the electron beam, the focal spot forms on the disc strongly compressed serpentine lines.

If the crank 39 were engaged with the engaging member 37 without longitudinal clearance, the output potential of potentiometer 29 would vary according to a harmonic movement that is a sine function when peculiarities of a crank drive having a crank of finite length, are disregarded.

Because the crank engages engaging member 37 by means of one end of slot 38 of suitably selected length, disc 36 stops immediately after crank pin 40 passes its two dead end positions, until crank 39 has performed such a longitudinal movement that the other end of the slot 38 engages the engaging element 37 and again moves in the opposite direction. The same relationship of time and distance holds for the sliding contact 31, and in view of the fact that any resistance of the potentiometer 29 is uniquely correlated with a specific deflection of the electron beam 6, the focal spot stops for the same short period in its point of reversal. The desired effect is thereby achieved.

The control of the deflecting voltage was described with reference to the mechanical adjustment of the potentiometer for the sake of convenient explanation. However, it is readily possible to achieve the same effects by means of an electronic control element.

The deflecting voltage, $U_a$ which is applied to the deflecting coil 15, is illustrated in FIG. 2 as a function of time *t*. The broken-line curve 45 shows the deflecting voltage required for a harmonic deflection movement of the beam 6. Curve 46 drawn in full line in FIG. 2 is an example of the deflecting voltage for the control of the electron beam according to the method of the invention. It is readily seen that the voltage in the range of maximal and minimal values corresponding to the points of reversal of the electron beams is held constant in the curve 46 for a longer period than in the broken-line, harmonic curve 45.

In FIG. 3 there is shown a cross-sectional view of a spent circular disc 20 of the material which is to be evaporated. Said disc rests on turntable 21, being driven by a shaft 22. In this case, evaporation has been performed according to the known method; the electron beam having moved harmonically between the points of reversal 47 and 48 on radial lines. The marginal zone and the center of the disc were preserved to the height of the original contour line 49. In the area between these locations a deep annular depression 50 was dug out of the disc which prevented further evaporation. The degree to which the expensive disc was utilized is small. That a bulge was left standing in the center of the disc is due to significant defocussing of the electron beam at the inner point of reversal. The preservation of an annular marginal bulge is to be attributed to the mass of the circular disc which increases with the radius. Both effects however are no longer relevant in the use of the method of the invention as is evident from FIG. 4.

FIG. 4 shows the same arrangement as in FIG. 3 with the sole difference that disc 20 was evaporated according to the method of the invention. The material of the disc has been removed almost uniformly over the entire surface of the disc so that only a flat, disc-shaped residue is left over. For comparison purposes, the original contour 49 of the disc is indicated in broken lines. The degree of utilization of the material was evidently substantially greater.

FIG. 5 illustrates the application of the method of the invention to a cylindrical body 50 consisting of the material to be evaporated. The cylinder is supported on a shaft 51 and rotates about its axis, the electron beam 6 being guided in such a manner that its focal spot travels on the curved surface of the cylinder in a helical path. Simultaneously, the beam oscillates parallel to the generating lines of the cylinder whereby a removal of material in uniform layers in the manner analogous to the showing of FIG. 4 is achieved. The residual cylinder has a substantially smooth surface.

FIG. 6 shows the application of the invention to the evaporation of a rectangular prism 52, consisting of the material to be evaporated, the prism being moved longitudinally in the direction of the arrow 53 relative to the electron beam 6. The beam oscillates with an amplitude which corresponds to the width of the prism, measured transversely to the direction of movement. Here, too, the material to be evaporated is removed in layers, without formation of grooves, with a good utilization of the material.

The methods illustrated in FIG. 4 and FIG. 6 are also applicable to so-called trough evaporation in which the material to be evaporated is arranged in loose form, for example as a granulate, in a crucible and is replenished continuously or intermittently by means of a feeding device. When the crucible has the shape of a flat, round dish, it may be set in the location of the disc 20 in FIG. 4. If the crucible is elongated and has the shape of a boat, it can be set in the position of the prism 52 in FIG. 6.

Example of application of the invention:

On the turntable 21 of an apparatus as illustrated in FIG. 1, a glass disc having a diameter of 70 mm. and a weight of 100 grams was placed. Electron gun 2 furnishes an electron beam focused in the central position in a focal spot of 30 mm.$^2$, the beam having an acceleration voltage of 10 kv. and a beam current of 80 ma. The deflecting voltage applied to the deflecting coil 15 was periodically changed by means of the potentiometer 29 between 3.3 and 5.2 volts, whereby the oscillating focal spot received an amplitude of about 15 mm. The length of the slot 38 was selected in such a manner relative to the other dimensions of the crank drive that the beam dwelt at each point of reversal for a period corresponding to 20% of the time required for a complete oscillation. The disc 20 was rotated at a speed of 0.2 r.p.m. 66 grams, that is, 66% of the initial weight could be evaporated from the disc 20 until the residual thickness was 4 mm., and the process had to be interrupted for safety reasons. The unevaporated residue corresponded to the view of FIG. 4.

I claim:

1. Method of forming coatings of non-metallic material of high melting point, particularly silicon dioxide or glass on substrates and evaporation of these materials from a substantially solid state in a vacuum by means of a beam of electron rays which heats the materials to be evaporated locally to their temperature of evaporation by scanning oscillatingly transversely to the direction of motion of said beam relative to these materials, characterized in that the electron beam is controlled in such a manner that the energy transmitted from it to the material to be evaporated per unit volume is increased at least within the range of the reversal points of the electron beam beyond the measure necessary during scanning with a harmonic deflection movement.

2. The method according to claim 1 wherein the dwell time of the electron beam near the reversal point is extended beyond that necessary for the scanning with the harmonic deflecting motion.

3. The method according to claim 1 characterized in that the electron beam is enhanced in its power intensity at least within range of its reversal points.

References Cited

UNITED STATES PATENTS

| | | | |
|---|---|---|---|
| 3,293,587 | 12/1966 | Robinson | 117—93.3 X |
| 3,387,999 | 6/1968 | Hacskaylo et al. | 117—106 R X |
| 3,432,335 | 3/1969 | Schniller et al. | 117—106 R |
| 3,552,352 | 1/1971 | McConnell | 117—93.3 |

EDWARD G. WHITBY, Primary Examiner

U.S. Cl. X.R.

117—106A, 121, 169A; 118—49.1; 219—121 EM